US011592629B2

(12) United States Patent
Kawamura et al.

(10) Patent No.: US 11,592,629 B2
(45) Date of Patent: Feb. 28, 2023

(54) OPTICAL MODULE

(71) Applicant: Nippon Telegraph and Telephone Corporation, Tokyo (JP)

(72) Inventors: Yuriko Kawamura, Musashino (JP); Yusuke Nasu, Musashino (JP); Kiyofumi Kikuchi, Musashino (JP); Shunichi Soma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/420,356

(22) PCT Filed: Jan. 7, 2020

(86) PCT No.: PCT/JP2020/000140
§ 371 (c)(1),
(2) Date: Jul. 1, 2021

(87) PCT Pub. No.: WO2020/145260
PCT Pub. Date: Jul. 16, 2020

(65) Prior Publication Data
US 2022/0066110 A1 Mar. 3, 2022

(30) Foreign Application Priority Data
Jan. 10, 2019 (JP) .............................. JP2019-002664

(51) Int. Cl.
*H04B 10/00* (2013.01)
*G02B 6/42* (2006.01)
*G02B 6/46* (2006.01)

(52) U.S. Cl.
CPC ........... *G02B 6/4239* (2013.01); *G02B 6/424* (2013.01); *G02B 6/4245* (2013.01);
(Continued)

(58) Field of Classification Search
CPC combination set(s) only.
See application file for complete search history.

(56) References Cited

U.S. PATENT DOCUMENTS 4,767,179 A * 8/1988 Sampson ............. G02B 6/4292
250/239
5,708,745 A * 1/1998 Yamaji ................. G02B 6/3849
385/139
(Continued)

FOREIGN PATENT DOCUMENTS

| JP | 2003-48066 A | 2/2003 |
| JP | 2007-114369 A | 5/2007 |
| WO | 2015-108181 A1 | 7/2015 |

OTHER PUBLICATIONS

H. Tanobe et al., Compact 100Gb/s DP-QPSK Integrated Receiver Module Employing Three-Dimensional Assembly Technology, Optics Express, Vo. 22, No. 5, 2014, pp. 6108-6113.

*Primary Examiner* — Agustin Bello
(74) *Attorney, Agent, or Firm* — Workman Nydegger

(57) ABSTRACT

An object is to easily convey by suction an optical module equipped with optical fibers having ends coupled to optical receptacles and mount the optical module on a substrate. An optical module according to the present invention includes an optical device to which optical fibers having ends coupled to optical receptacles are optically coupled and also includes a carrier composed of a substrate and adhesive layers formed on the upper and lower surfaces of the substrate. The optical device is bonded on the adhesive layer formed on the lower surface of the substrate. Part of the optical fibers and the optical receptacles are bonded on the adhesive layer formed on the surface of the substrate.

9 Claims, 6 Drawing Sheets

(52) U.S. Cl.
CPC ............. *G02B 6/4257* (2013.01); *G02B 6/46*
(2013.01); *G02B 6/4279* (2013.01)

(56) References Cited

U.S. PATENT DOCUMENTS

| | | | | |
|---|---|---|---|---|
| 6,890,107 B1* | 5/2005 | Brophy | ................ | G02B 6/4201 385/88 |
| 7,021,833 B2* | 4/2006 | Loh | ...................... | G02B 6/4214 385/94 |
| 7,223,027 B2* | 5/2007 | Mader | .................. | G02B 6/3893 398/139 |
| 7,729,581 B2* | 6/2010 | Rolston | ................ | G02B 6/4232 385/52 |
| 8,740,476 B2* | 6/2014 | Mori | ................... | G02B 6/3885 385/88 |
| 10,365,445 B2* | 7/2019 | Badihi | ................ | G02B 6/4452 |
| 10,566,287 B1* | 2/2020 | Ding | ................ | H01L 24/17 |
| 11,256,029 B2* | 2/2022 | Kannan | ................ | G02B 6/13 |
| 2003/0031418 A1* | 2/2003 | Yoshikawa | ............ | H05K 3/303 385/88 |
| 2005/0018974 A1* | 1/2005 | Rolston | ................ | G02B 6/4214 385/83 |
| 2005/0018993 A1* | 1/2005 | Rolston | ................ | G02B 6/3885 385/137 |
| 2006/0145343 A1* | 7/2006 | Lee | ................... | H01L 23/49816 257/737 |
| 2007/0120240 A1* | 5/2007 | Foo | ........................ | H01L 24/32 257/E21.511 |
| 2007/0258683 A1* | 11/2007 | Rolston | ................ | G02B 6/4292 385/88 |
| 2010/0098382 A1* | 4/2010 | Tamura | ................ | G02B 6/4257 385/78 |
| 2013/0004120 A1* | 1/2013 | Zbinden | ................ | G02B 6/4293 385/14 |
| 2016/0062063 A1* | 3/2016 | Ogura | ................... | G02B 6/305 264/1.27 |
| 2016/0163590 A1* | 6/2016 | Jung | ................... | H01L 21/6835 438/666 |
| 2016/0349463 A1 | 12/2016 | Akashi | | |
| 2017/0254968 A1* | 9/2017 | Ding | ....................... | H01L 24/20 |
| 2017/0315299 A1* | 11/2017 | Mathai | ................... | G02B 6/34 |
| 2017/0330837 A1* | 11/2017 | Stahr | ................ | H01L 23/49838 |
| 2018/0254831 A1* | 9/2018 | Ishii | ....................... | H04B 10/58 |
| 2018/0351684 A1* | 12/2018 | Osenbach | ............ | H04B 10/506 |
| 2020/0116930 A1* | 4/2020 | Kannan | ................ | G02B 6/122 |
| 2020/0162156 A1* | 5/2020 | Parker | ............... | H01L 31/02327 |
| 2020/0363598 A1* | 11/2020 | Hjartarson | ........... | G02B 6/3878 |
| 2021/0104637 A1* | 4/2021 | Amano | ................ | G02B 6/136 |
| 2021/0215893 A1* | 7/2021 | Wakita | ................ | G02B 6/4244 |
| 2021/0239908 A1* | 8/2021 | Ishii | ....................... | G02B 6/4246 |
| 2021/0247575 A1* | 8/2021 | Yanagihara | ............... | G02B 6/30 |
| 2021/0382249 A1* | 12/2021 | Kawamura | .......... | G02B 6/4257 |
| 2022/0066110 A1* | 3/2022 | Kawamura | .......... | G02B 6/4239 |

\* cited by examiner

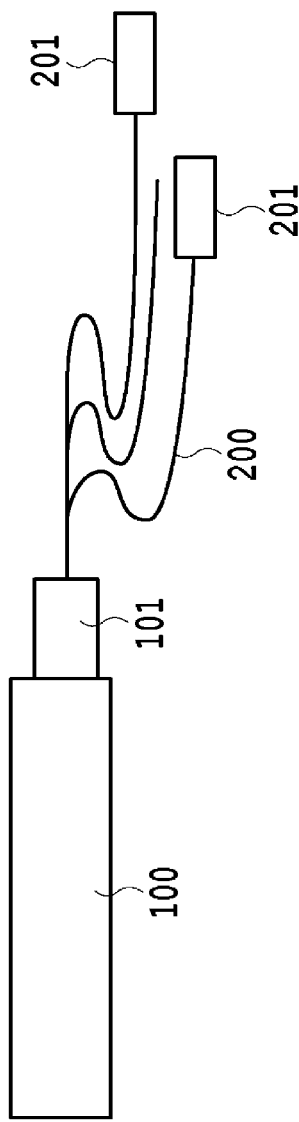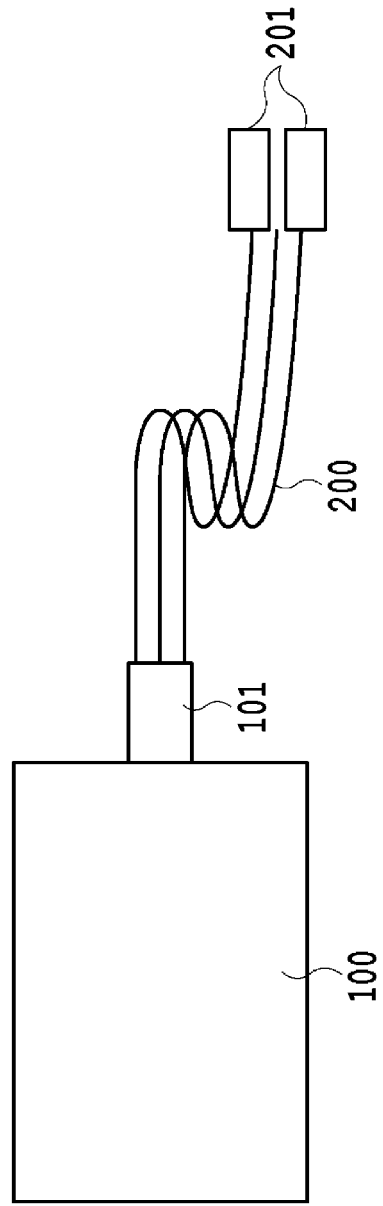

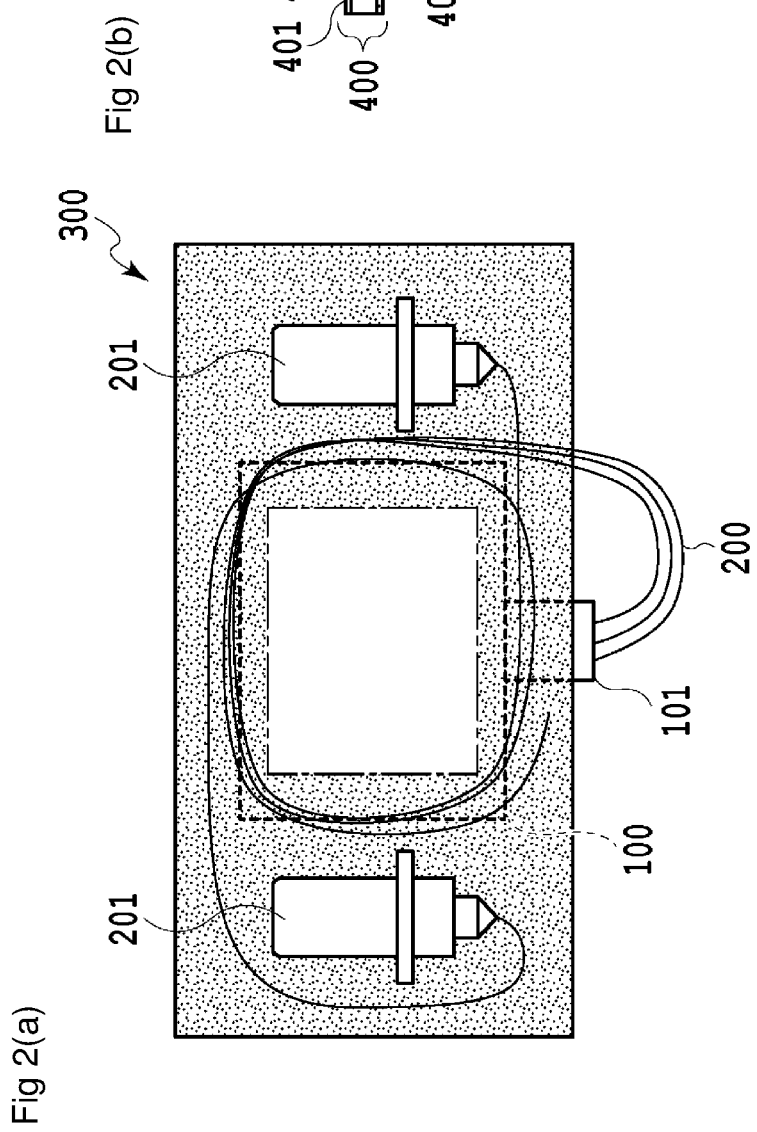

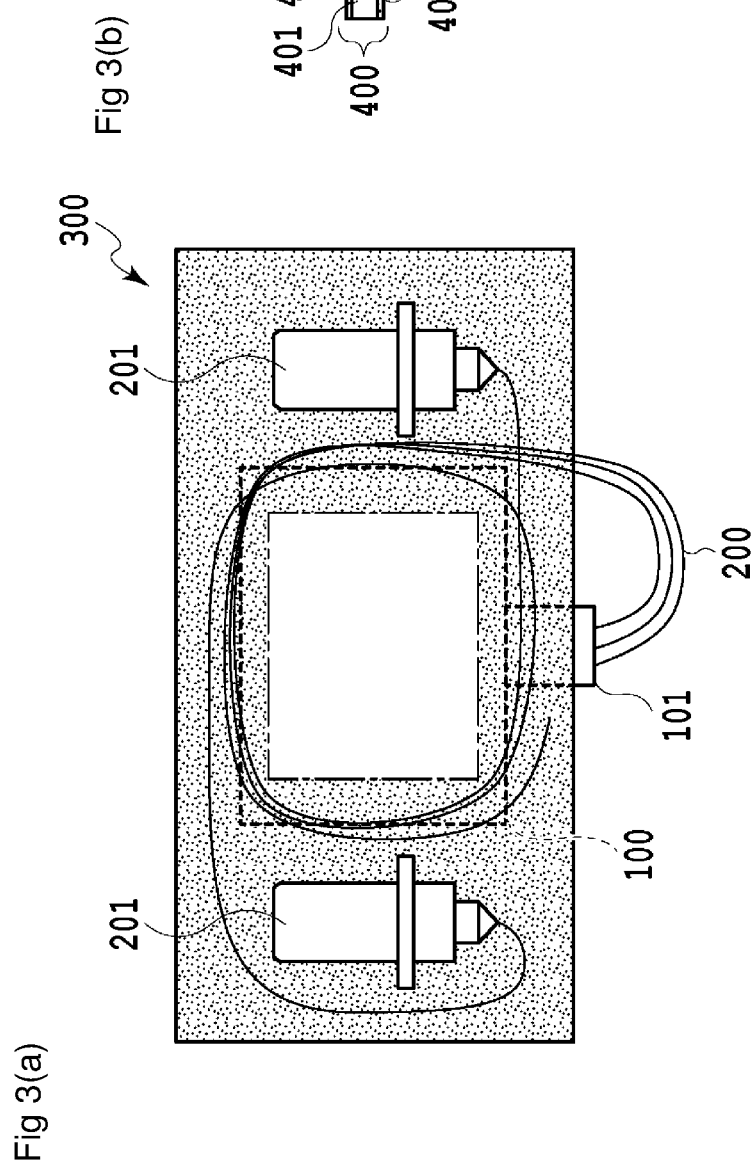

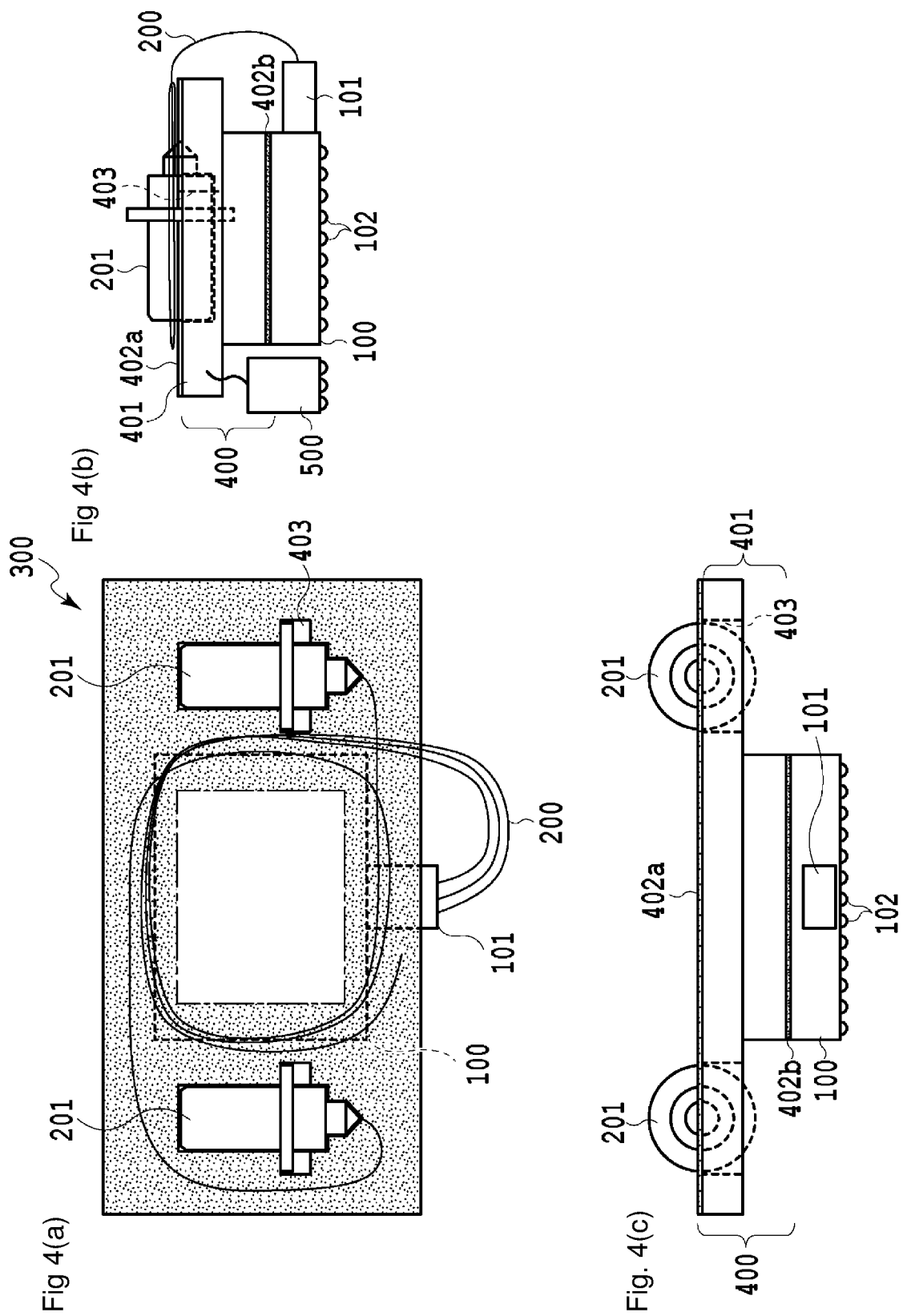

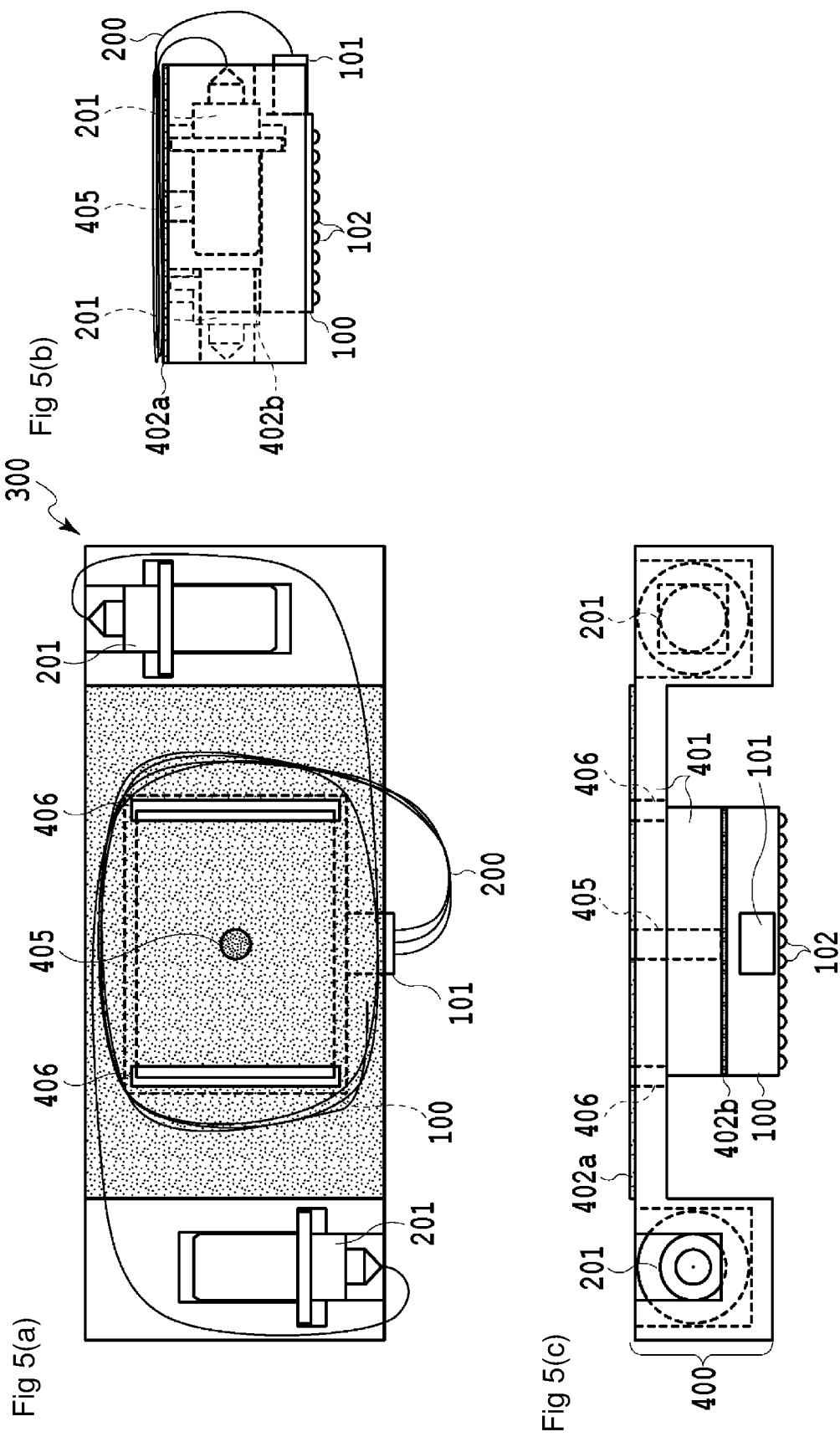

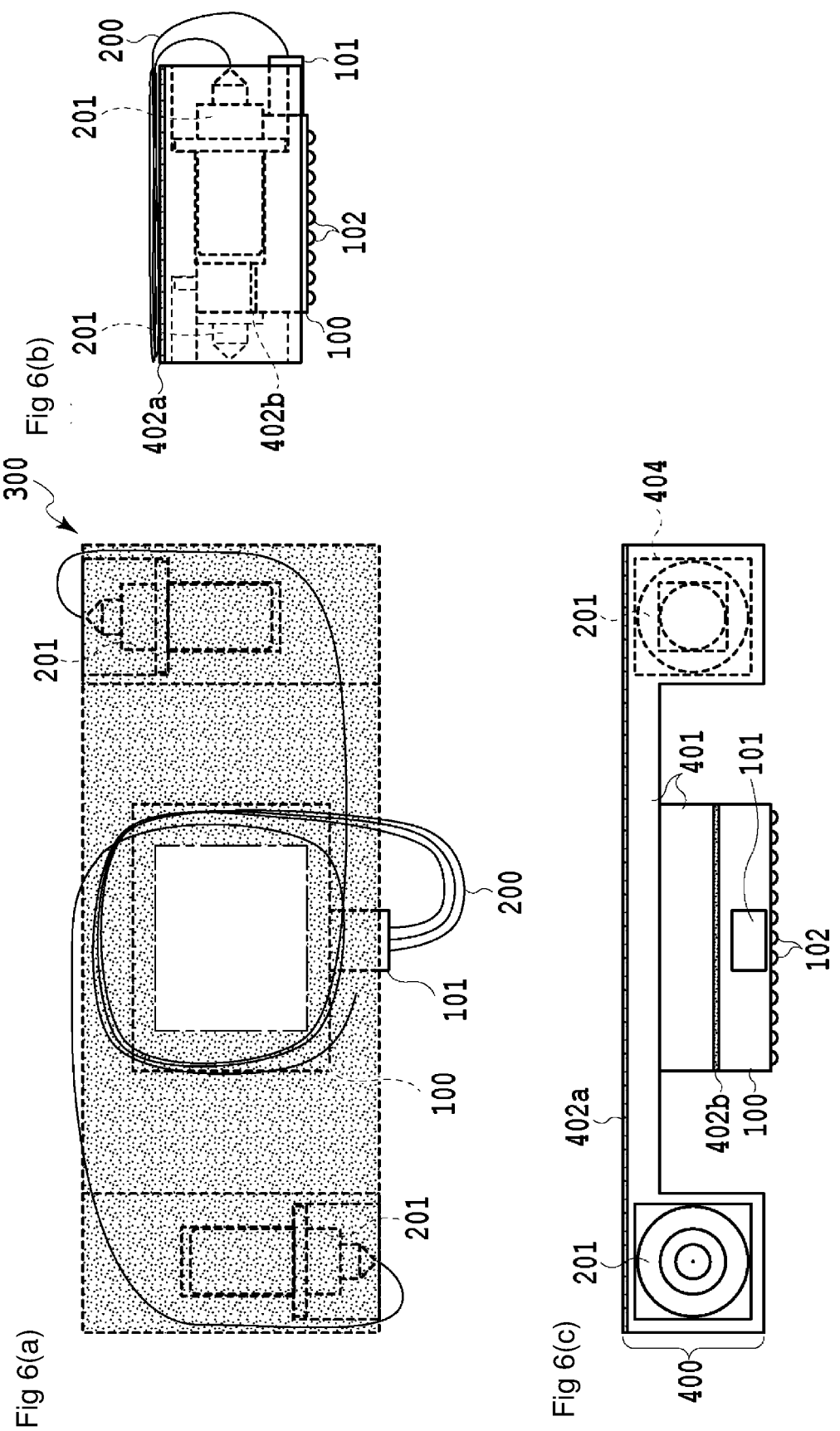

OPTICAL MODULE

TECHNICAL FIELD

The present invention relates to optical communication components for transmitting and processing radio frequency signals and optical signals. In particular, the present invention relates to an optical module having a carrier that is used to bond an optical device unit and optical fiber units and that enables mounting by suction conveyance with the use of a mounter or the like so that the optical module can be subjected to a reflow process.

BACKGROUND ART

Against the backdrop of rapidly increasing demands for telecommunications, studies have been actively conducted to implement high-capacity communication networks. Also with regard to optical modules, for the purpose of improving bit rates per unit volume of communication facilities, there is a strong demand for compact optical modules with highly dense functional units. A ball grid array (BGA) technology is the key to downsizing of optical modules because the BGA technology can implement a large number of electrical interfaces in a highly dense manner (Non-Patent Literature 1). Furthermore, since a BGA package is attached to a substrate by reflow soldering, it is expected to reduce mounting costs as compared to the case of known optical modules in which a pin package with pins arranged on sides or a FPC package is attached to a substrate by soldering in an individual manner.

CITATION LIST

Patent Literature

Patent Literature 1: International Publication No. WO 2015/108181

Non-Patent Literature

Non-Patent Literature 1: H. Tanobe, Y. Kurata, Y. Nakanishi, H. Fukuyama, M. Itoh, and E. Yoshida, "Compact 100 Gb/s DP-QPSK integrated receiver module employing three-dimensional assembly technology,", 2014, OPTICS EXPRESS 22(5), pp. 6108-6113.

SUMMARY OF THE INVENTION

Technical Problem

However, unlike an electronic device, a known optical device 100 usually includes optical fibers 200 for inputting and outputting optical signals through an optical fiber block 101 as illustrated in FIGS. 1(a) and 1(b). FIG. 1(a) is a side view of the known optical device equipped with optical fibers. FIG. 1(b) is a top view of the known optical device equipped with optical fibers. The optical device 100 deforms when heat is applied to the optical device 100; thus, when the optical device connected to optical fibers is subjected to a reflow process, the optical fibers may move in the oven. Furthermore, there is a concern that the movement of the optical fibers 200 in turn moves the optical module itself, and consequently, the optical device 100 is not necessarily mounted at a predetermined position by employing the BGA technology, which may result in faulty electrical connection. Moreover, with the aim of simplification of the mounting process, it is desirable that a downsized optical module is mounted at a predetermined position by being subjected to suction conveyance with the use of a mounter or the like; it is, however, difficult to subject an optical module equipped with the optical fibers 200 and optical receptacles 201 to suction conveyance by using a usual mounter because the optical fibers may obstruct the process.

One solution for these problems is to fix optical fibers wound around a reel onto an optical device. However, this solution requires a complex process of winding fibers around a reel. Furthermore, since the height of the reel is additionally included in the height of the optical module, the optical device cannot be attached to a substrate by using a usual reflow oven that has been made without consideration of high-profile components.

Furthermore, in the case of the optical device to which optical fibers with optical receptacles are connected as described in Patent Literature 1, if the solution described above is employed, the optical receptacles, which are high-profile components, are fixed onto the module; this further limits useable reflow ovens.

The present invention has been made in consideration of the above problems, and an object thereof is to provide an optical module having a carrier that is used to bond an optical device unit and optical fiber units and that enables mounting by suction conveyance with the use of a mounter or the like so that the optical module can be subjected to a reflow process.

Means for Solving the Problem

The present invention is characterized in the following structure to achieve the object. An optical module according to the present invention includes an optical device to which one or more optical fibers are optically coupled, an optical receptacle optically coupled to at least one of the one or more optical fibers, and a carrier including a substrate and an adhesive layer formed on a surface of the substrate. Both or either of the optical fibers and the optical device is bonded on a surface of the adhesive layer.

Effects of the Invention

The present invention can provide an optical module having a carrier that is used to bond an optical device unit and optical fiber units and that enables mounting by suction conveyance with the use of a mounter or the like so that the optical module can be subjected to a reflow process.

BRIEF DESCRIPTION OF DRAWINGS

FIG. 1(a) is a side view of a known optical device equipped with optical fibers. FIG. 1(b) is a top view of the known optical device equipped with optical fibers.

FIG. 2(a) is a top view of an optical module according to a first embodiment of the present invention. FIG. 2(b) is a side view of the optical module according to the first embodiment of the present invention.

FIG. 3(a) is a top view of an optical module according to a second embodiment of the present invention. FIG. 3(b) is a side view of the optical module according to the second embodiment of the present invention.

FIG. 4(a) is a top view of an optical module according to a third embodiment of the present invention. FIG. 4(b) is a side view of the optical module according to the second embodiment of the present invention. FIG. 4(c) is another side view in another direction of the optical module according to the second embodiment of the present invention.

FIG. 5(a) is a top view of an optical module according to a fourth embodiment of the present invention. FIG. 5(b) is a side view of the optical module according to the fourth embodiment of the present invention. FIG. 5(c) is another side view in another direction of the optical module according to the fourth embodiment of the present invention.

FIG. 6(a) is a top view of an optical module according to a fifth embodiment of the present invention. FIG. 6(b) is a side view of the optical module according to the fifth embodiment of the present invention. FIG. 6(c) is another side view in another direction of the optical module according to the fifth embodiment of the present invention.

DESCRIPTION OF EMBODIMENTS

Hereinafter, embodiments of the present invention will be described with reference to the drawings. In the drawings, parts having the same function are assigned the same reference characters for the purpose of providing clear description.

However, the present invention is not limited by the following description of the embodiments. It will be obvious to those skilled in the art that various modifications to the embodiments and details can be made without departing from the spirit of the invention disclosed in the specification and the like. In addition, structures according to different embodiments can be implemented by being combined with each other as appropriate.

First Embodiment

FIGS. 2(a) and 2(b) are top and side views illustrating a structure of an optical module 300 according to a first embodiment of the present invention. As illustrated in FIG. 2, the optical module 300 according to the first embodiment of the present invention includes the optical device 100, the optical fiber block 101 for optically coupling the optical fibers 200, the optical receptacles 201 optically coupled to the optical fibers 200, and a carrier 400 having a carrier substrate (also simply referred to as a substrate) 401 and adhesive layers 402a and 402b formed on the surfaces of the carrier substrate. The optical module 300 includes a silicon photonics chip.

In the carrier 400, for example, a high-heat-resistance special glass-epoxy material (an insulating base material formed by impregnating glass fiber with epoxy resin), aluminum, or the like can be used to form the carrier substrate 401. The adhesive layers 402a and 402b can be formed by directly making a resin spread over the carrier substrate 401 or attaching adhesive layers formed in sheets to the carrier substrate 401.

In this structure, the adhesive layers are formed on both the lower and upper surfaces of the carrier. The adhesive layer 402b formed at the bottom is used to bond the carrier 400 and the optical device 100, while the adhesive layer 402a formed at the top is used to bond the optical fibers 200 and the optical receptacles 201 to the carrier 400. As a region for vacuum suction, a region without the adhesive layer is arranged on top of the carrier as indicated by a rectangle in the middle of FIG. 2(a).

Since the optical module 300 is formed by bonding the optical device 100, the optical fibers 200, and the optical receptacles 201 to the carrier 400, the optical module 300 can be conveyed by vacuum suction with the use of a mounter or the like, which is the same method as that for known electronic devices without the optical fibers 200 or the optical receptacles 201. In this method, suction conveyance is carried out by using a collet having a suction area smaller than the region for vacuum suction on the upper surface of the carrier. By the process described above, it is possible to obtain the optical module including the optical device 100 to which one or more optical fibers are optically coupled, the optical receptacle 201 optically coupled to at least one of the one or more optical fibers, and the carrier 400 including the carrier substrate 401 and the adhesive layers 402a and 402b formed on the upper and lower surfaces of the carrier substrate 401. The optical fibers 200 are bonded to the adhesive layer 402a formed on the surface of the carrier substrate 401. The optical device 100 is bonded to the adhesive layer 402b formed on the lower surface of the carrier substrate 401.

Second Embodiment

FIGS. 3(a) and 3(b) are top and side views illustrating a structure of the optical module 300 according to a second embodiment of the present invention. As illustrated in FIGS. 3(a) and 3(b), the optical module 300 according to the second embodiment of the present invention is formed by arranging a ball grid array (BGA) electrode 102 at the optical device 100 in addition to the structure described in the first embodiment.

The BGA electrode 102 is arranged on the assumption that the optical device 100 may be attached to another substrate or the like by a reflow process. Since the optical fibers 200 are bonded to the adhesive layer 402a, the movement of the optical fibers 200 can be limited when thermal stress occurs on the fibers during reflow heating. The carrier 400 is formed of a material that enables the carrier 400 to tolerate a condition according to a reflow soldering thermal history (temperature and time of reflow heating).

This structure can prevent the optical device 100 from being moved to and fixed at a position different from a predetermined position by a reflow process. Moreover, the first and second embodiments have a merit of simple shape.

Third Embodiment

FIGS. 4(a), 4(b), and 4(c) are a top view of the optical module 300 according to a third embodiment of the present invention, a side view in a longitudinal direction, and another side view in a transverse direction, respectively. As illustrated in FIG. 4, the optical module 300 according to the third embodiment of the present invention is formed such that, on the basis of the structure described in the second embodiment, the carrier substrate 401 protrudes downwards in a sectional view and the optical device 100 is bonded to the lower surface of the downward protrusion by the adhesive layer 402b. Additionally, the optical fibers 200 are bonded to the upper surface of the carrier substrate 401 by the adhesive layer 402a, and also, hollows (grooves) 403 for arranging the optical receptacles 201 are arranged.

The third embodiment is designed to arrange the hollows (grooves) 403, in which the optical receptacles 201 can be arranged, at the upper surface of the carrier substrate 401 as illustrated in FIG. 4. By arranging the optical receptacles 201 in these hollows (grooves) 403, the optical module 300 can be formed in a low-profile manner (the optical module 300 can be thinned). Furthermore, the optical receptacles 201 are fixed to the hollows (grooves) 403, and thus, this structure can prevent the optical receptacles 201 from falling off due to poor bonding.

In the second embodiment, the carrier 400 is larger than the optical device 100, and as a result, it is impossible to arrange a different component (another component) higher than the optical device 100 at the bottom of the carrier 400, that is close to the optical device 100. However, in the third embodiment, since the carrier 400 protrudes downwards, a different component (another component) 500 can be arranged at the bottom of the thin portion of the carrier 400. This structure enables efficient use of the area of mounting substrate.

Further, in the third embodiment, the hollows (grooves) 403 are provided at positions that enable the center of gravity of the optical module 300 to correspond to the center of gravity of the optical device 100 to balance the optical module 300 during the mounting process; however, by implementing methods such as providing a hole at the carrier substrate 401, the hollows (grooves) 403 can be arranged at any positions of the top of the carrier 400.

Moreover, while in the third embodiment the optical fibers are fixed to the adhesive layer 402a arranged on top of the carrier substrate, the optical fibers 200 may be fixed to another adhesive layer arranged at a region at the bottom of the carrier 400 in which the optical device 100 is not bonded.

Fourth Embodiment

FIGS. 5(a), 5(b), and 5(c) are a top view illustrating a structure of the optical module 300 according to a fourth embodiment of the present invention, a side view in a transverse direction, and another side view in a longitudinal direction, respectively. As illustrated in FIG. 5, the optical module 300 according to the fourth embodiment of the present invention includes, instead of the grooves 403 arranged at the top of the carrier substrate in the structure described earlier in the third embodiment, cavities 404 for arranging the optical receptacles 201 are arranged at sides of the carrier substrate 401. The optical fibers are bonded to the adhesive layer 402a formed on top of the carrier substrate 401. The cavities 404 can accommodate (house) the optical receptacles 201.

In the fourth embodiment, similarly to the third embodiment, the optical module 300 can be formed in a low-profile manner. Also similarly to the third embodiment, the optical receptacles 201 can be prevented from falling off during the mounting process. Moreover, the cavities 404 can protect optical surfaces of the optical receptacles 201.

In the fourth embodiment, the cavities 404 for arranging the optical receptacles are provided such that the center of gravity of the optical module 300 corresponds to the center of gravity of the optical device 100 to balance the optical module 300 during the mounting process; however, by implementing methods such as providing a hole at the carrier substrate, the cavities 404 can be arranged at any positions of the top of the carrier 400.

Moreover, while in the fourth embodiment the optical fibers 200 are fixed to the adhesive layer 402a arranged on top of the carrier substrate 401, the optical fibers 200 may be fixed to another adhesive layer arranged at a region at the bottom of the carrier 400 in which the optical device 100 is not bonded.

Fifth Embodiment

FIGS. 6(a), 6(b), and 6(c) are a top view illustrating a structure of the optical module 300 according to a fifth embodiment of the present invention, a side view in a transverse direction, and another side view in a longitudinal direction, respectively.

As illustrated in FIG. 6, the optical module 300 according to the fifth embodiment of the present invention has, in addition to the structure described in the fourth embodiment, a hole 405 for vacuum suction and windows 406 for checking an outline of the optical device 100. The hole 405 is formed through the carrier substrate 401 and the adhesive layer 402b. The windows 406 are formed through the carrier substrate and the adhesive layer at positions at which the outline of the optical device 100 can be checked. Additionally, the fifth embodiment differs from the third embodiment in the positions of the hollows (grooves) 403.

In the fifth embodiment, the hole 405 enables not only the carrier 400 but also the optical device 100 to be subjected to vacuum suction. With the structures described in the first, second, third, and fourth embodiments, when the optical module 300 is being conveyed by vacuum suction, the optical device 100 is being moved while being held with only the retention force of the adhesive layer 402b formed at the bottom of the carrier substrate. In the fifth embodiment, the optical module 300 can be conveyed while the optical device 100 is held directly by vacuum suction in addition to the retention force of the adhesive layer. The structure of the fifth embodiment can prevent the optical device 100 from falling off the adhesive layer 402b during conveyance.

Furthermore, the outline of the optical device 100 can be accurately located by viewing the optical module 300 from above the windows 406 arranged at the positions at which the outline can be checked. Positioning for mounting the optical device 100 equipped with a BGA electrode needs to be accurately performed by employing image recognition technologies. This is because, for example, the distance between balls of the BGA electrode needs to be a narrow pitch such as 0.5 µm due to demands for downsizing the optical device 100 and increasing the packaging density.

While in the fifth embodiment the optical fibers 200 are fixed to the adhesive layer 402a arranged on the upper surface of the carrier substrate 401, the optical fibers 200 may be fixed to another adhesive layer arranged at a region at the bottom of the carrier 400 in which the optical device 100 is not bonded.

The first to fifth embodiments describe an example in which the optical fibers are bonded to the adhesive layer provided on the carrier substrate, but only the optical device may be bonded to the adhesive layer provided on the carrier substrate.

INDUSTRIAL APPLICABILITY

The present invention can be applied to optical communication components for transmitting and processing radio frequency signals and optical signals.

REFERENCE SIGNS LIST

100 Optical device
101 Optical fiber block
102 BGA electrode
200 Optical fiber
201 Optical receptacle
300 Optical module
400 Carrier
401 Carrier substrate (substrate)
402a Adhesive layer 402b Adhesive layer
403 Hollow (groove)
404 Cavity
405 Hole
406 Window
500 Different component (another component)

The invention claimed is:

1. An optical module comprising:
an optical device to which one or more optical fibers are optically coupled;
an optical receptacle optically coupled to at least one of the one or more optical fibers; and
a carrier including a substrate and a first adhesive layer formed on a first surface of the substrate and a second adhesive layer formed on a second surface of the substrate,
wherein the first surface and the second surface are on opposite sides of the substrate,
wherein the one or more optical fibers are bonded to a surface of the first adhesive layer such that at least one of the one or more optical fibers are fixed to the substrate and the optical device is bonded on a surface of the second adhesive layer such that the optical device is fixed to the substrate.

2. The optical module according to claim 1, wherein the optical device comprises a ball grid array electrode.

3. The optical module according to claim 1, wherein the carrier is formed of a material that enables the carrier to tolerate a condition according to a reflow soldering thermal history.

4. The optical module according to claim 1, wherein the substrate protrudes downwards to have a protrusion and the second adhesive layer is formed on a lower surface of the protrusion and the optical device is fixed on the surface of the second adhesive layer.

5. The optical module according to claim 1, wherein the optical device is fixed to the substrate in a manner that enables an outline of the optical device to be partially checked from above the carrier.

6. The optical module according to claim 1, wherein a hole for subjecting the optical device to vacuum suction is provided at the substrate.

7. The optical module according to claim 1, wherein a hollow for housing the optical receptacle is provided at the substrate.

8. The optical module according to claim 1, wherein a cavity for housing the optical receptacle is provided at the substrate.

9. The optical module according to claim 1, wherein the optical device includes a silicon photonics chip.

* * * * *